US009281959B2

(12) United States Patent
Jin et al.

(10) Patent No.: US 9,281,959 B2
(45) Date of Patent: Mar. 8, 2016

(54) METHOD FOR CONTROLLING HOME NETWORK DEVICE USING UNIVERSAL WEB APPLICATION AND APPARATUS THEREOF

(75) Inventors: Ho Jin, Yongin-si (KR); Young-Chul Sohn, Seoul (KR); Jong-Wook Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 12/745,003

(22) PCT Filed: Nov. 27, 2008

(86) PCT No.: PCT/KR2008/006990
§ 371 (c)(1),
(2), (4) Date: May 27, 2010

(87) PCT Pub. No.: WO2009/069949
PCT Pub. Date: Jun. 4, 2009

(65) Prior Publication Data
US 2010/0305722 A1 Dec. 2, 2010

Related U.S. Application Data

(60) Provisional application No. 60/990,404, filed on Nov. 27, 2007, provisional application No. 60/990,415, filed on Nov. 27, 2007, provisional application No. 60/991,448, filed on Nov. 30, 2007.

(51) Int. Cl.
*G06F 15/16* (2006.01)
*H04L 12/28* (2006.01)
(52) U.S. Cl.
CPC .................................. *H04L 12/2818* (2013.01)

(58) Field of Classification Search
CPC ............ H04L 12/2818; H04L 12/2816; H04L 12/2807; H04L 12/2838; H04L 67/28
USPC .......................................... 709/203, 206, 208
See application file for complete search history.

(56) References Cited

U.S. PATENT DOCUMENTS

| 7,920,549 | B2 * | 4/2011 | Alt et al. ........................ 709/203 |
| 2002/0083143 | A1 * | 6/2002 | Cheng ........................... 709/208 |
| 2003/0110298 | A1 | 6/2003 | Lanigan |
| 2003/0200340 | A1 * | 10/2003 | Hutter ........................... 709/250 |
| 2006/0069713 | A1 * | 3/2006 | Wei et al. ....................... 709/202 |

(Continued)

FOREIGN PATENT DOCUMENTS

| KR | 10-2005-0094286 A | 9/2005 |
| KR | 10-2007-0060997 A | 6/2007 |
| WO | 2007009877 A1 | 1/2007 |

OTHER PUBLICATIONS

Communication dated Oct. 11, 2012 issued by the State Intellectual Property Office of P.R. China in counterpart Chinese Patent Application No. 200880118083.7.

(Continued)

*Primary Examiner* — Minh-Chau Nguyen
(74) *Attorney, Agent, or Firm* — Sughrue Mion, PLLC

(57) ABSTRACT

A method of controlling a home network device by using a universal web application. In the method, the universal web application may receive control information, for controlling the home network device, from a server. A control command, which is issued to control the home network device, may be sent to a control point module by using a script application program interface (API) that is included in the received control information. Accordingly, result data that is obtained by executing the control command on the home network device may be received by the control point module.

34 Claims, 7 Drawing Sheets

(56) References Cited

U.S. PATENT DOCUMENTS

| | | | |
|---|---|---|---|
| 2007/0083618 A1 | 4/2007 | Kim | |
| 2007/0258718 A1* | 11/2007 | Furlong et al. | 398/106 |
| 2008/0205419 A1* | 8/2008 | Shin et al. | 370/401 |
| 2009/0307307 A1* | 12/2009 | Igarashi | 709/203 |

OTHER PUBLICATIONS

Communication dated Jul. 3, 2013, issued by the State Intellectual Property Office of P.R.C. in counterpart Chinese Application No. 200880118083.7.

Communication issued on Dec. 23, 2014 by the European Patent Office in related application No. 08854319.4.

Communication issued on Feb. 16, 2015 by The State Intellectual Property Office of PR China in related application No. 200880118083.7.

CEA-2014-A; Web-based Protocol and Framework for Remote User Interface no UPnPtm Networks and Internet (Web4CE); pp. 176; (c)Consumer Electronic s Association 2007; Arlington, Virginia, USA; date: Jul. 2007.

* cited by examiner

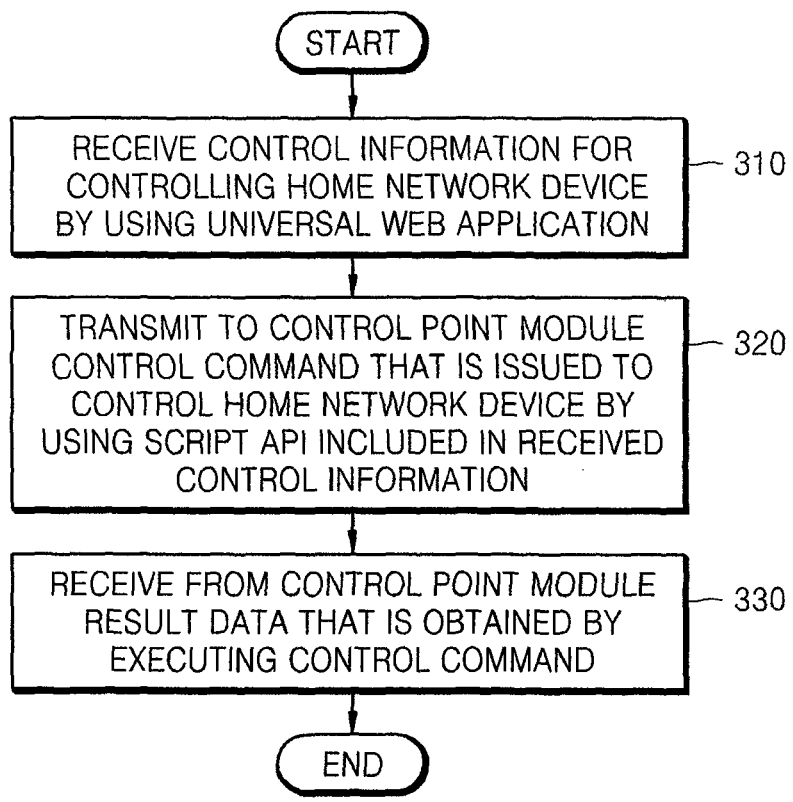

FIG. 4

410 { UPnPAction(string deviceID, string svcName, string actionName, string params)

420 {
- CreateRecordSchedule() → UPnPAction(deviceID, service, "CreateRecordSchedule", "<arguments><Elements>···</Elements></arguments>")
- GetRecordSchedule() → UPnPAction(deviceID, service, "GetRecordSchedule", "<arguments><RecordScheduleID>···</RecordScheduleID><Filter>···</Filter></arguments>")
- EnableRecordSchedul() → UPnPAction(deviceID, service, "EnableRecordSchedul", "<arguments><RecordScheduleID>···</RecordScheduleID></arguments>")

FIG. 6

```
<?xml version="1.0" encoding="UTF-8"?>
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
    <head>
        <title>UPnP SRS Example</title>
        <script type="text/javascript">

InitRecord()
{
    Record("ABC news", "ANALOG", "7", "T19:00:00", "P01:00:00");
    Record("ABC news", "NETWORK", "http://201.23.2.13/tvshow.tp", "T19:00:00", "P01:00:00");
}

Record(title, channelID, channelIDType, startTime, duration)
{
    if(FindDevice ("SRS"))
    {
        var xmlheader =
        "<?xml version=\"1.0\" encoding=\"UTF-8\"?>
        <srs xmlns=\"urn:schemas-upnp-org:avwc:srs\"
        xmlns:xsi=\"http://www.w3.org/2001/XMLSchema-instance\"
        xsi:schemaLocation=\"
            urn:schemas-upnp-org:avwc:srs
            http://upnp.org/standardizeddcps/schemas/avwc/srs/1.00\">";   — 610 ret = UPnPAction(device, service, "CreateRecordSchedule", "<arguments><Elements>"
        xmlheader + "<item id=\"\">" +
            "<title>"+title+"</title>"+
            "<class>OBJECT.RECORDSCHEDULE.DIRECT.MANUAL</class>
            <scheduledChannelID type=\"" +channelIDType+"\">" + channelID+"</scheduledChannelID>" +      — 620
            "<scheduledStartDateTime>"++ startTime + "</scheduledStartDateTime>
            <scheduledDuration>" + duration + "</scheduledDuration>
        </item>
        </srs>
        </Elements>
        </arguments>");
        ...
    }
}

</script>
    </head>
    <body onload="initRecord()">
</body>
</html>
```

METHOD FOR CONTROLLING HOME NETWORK DEVICE USING UNIVERSAL WEB APPLICATION AND APPARATUS THEREOF

CROSS-REFERENCE TO RELATED PATENT APPLICATION

This application claims priority from U.S. Provisional Patent Application No. 60/990,404 filed on Nov. 27, 2007, U.S. Provisional Patent Application No. 60/990,415 filed on Nov. 27, 2007, U.S. Provisional Patent Application No. 60/991,448 filed on Nov. 30, 2007, and PCT Application No. PCT/KR2008/006990 filed on Nov. 27, 2008, the disclosures of which are incorporated herein by reference in their entireties.

BACKGROUND

1. Field

Exemplary embodiments of the present disclosure relate to a method and apparatus for controlling a home network device by using a universal web application in a home network environment.

2. Description of Related Art

With the popularity of home networks, a conventional personal computer (PC)-oriented network environment increasingly extends to an environment including electric home appliances using various lower network communication techniques. Accordingly, home network middleware standards, such as universal plug and play (UPnP) and digital living network alliance (DLNA), have been proposed to network these home appliances in a unified manner according to an Internet protocol (IP).

DLNA, which is a collaboration allowing electronic devices within the home to connect to one another, builds interoperable networked platforms so that devices designed according to DLNA interoperability guidelines can freely share media content, such as music, photos, and videos, across a home network.

UPnP defines a plurality of UPnP devices, which provide services, and UPnP control point applications, called control point modules, which control the plurality of UPnP devices. A control point module refers to an application that is mounted on a device provided with a user interface, such as a PC or a television (TV) (digital TV (DTV) or IPTV), and controls a plurality of UPnP devices. Such a control point module discovers various types of devices according to an external input, describes functions of the discovered devices, and controls services provided by the devices according to simple object access protocol (SOAP).

A UPnP/DLNA device, such as a PC, TV, personal digital assistant (PDA), mobile phone, network equipment, printer, and any one of various types of audio/video devices connected to a home network, notifies a control point module about an event occurring therein. Also, the UPnP/DLNA device provides a presentation web page to the control point module so that the control point module can control the UPnP/DLNA device and inquire about the state of the UPnP/DLNA device by using the presentation web page.

As described above, a conventional method of controlling a UPnP/DLNA device in a home network uses a UPnP/DLNA control point application called a control point module or a static presentation web page provided by the home network device.

A home network environment using a remote user interface (UI) consists of a remote UI client (RUIC), a remote UI server (RUIS), and UPnP/DLNA devices. Examples of a conventional remote UI technique include an expandable home theater (XHT), Crawford engineering associates (CEA) 201.4, and an extended remote technology (XRT).

SUMMARY

The present disclosure provides a method and apparatus for controlling a universal plug and play/digital living network alliance (UPnP/DLNA) device over the web by using a universal web application.

The present disclosure also provides a method and apparatus for controlling a function embedded in control equipment as a UPnP/DLNA device by using a universal web application.

According to an exemplary embodiment, there is provided a method of controlling a home network device by using a universal web application, the method comprising: receiving from a server control information for controlling the home network device, wherein the receiving is performed by the universal web application; transmitting a control command, which is issued to control the home network device, to a control point module by using a script application program interface (API) that is included in the received control information; and receiving from the control point module result data that is obtained by executing the control command on the home network device.

The universal web application may be a HyperText Markup Language (HTML)-based web browser or an Extensible Markup Language (XML)-based widget, and the script API may have a uniform format and comprise a name of an API, which is mapped to a home network API that is used for the control point module to execute the control command, and parameters for the mapped API.

The transmitting of the control command to the control point module may comprise transmitting to the control point module the home network API, which is used to execute the control command, as a variable included in the script API.

The transmitting of the control command to the control point module may comprise transmitting a plurality of control commands by using a macro API that is used to execute one or more control commands on the home network device.

The receiving of the control information may be performed by asynchronous Hypertext Transfer Protocol (HTTP) communication for user interface screen configuration. The asynchronous communication may use asynchronous JavaScript and XML (Ajax).

A home network may be a Universal Plug and Play/Digital Living Network Alliance (UPnP/DLNA)-based home network, the home network device may be a UPnP/DLNA device, the home network API may be a UPnP/DLNA API, and the control point module may be a plug-in application, which communicates with the universal web application, or an embedded object application of a browser.

The plug-in application may invoke the UPnP/DLNA API that is used to execute the received control command.

The plug-in application may transmit the result data, which is obtained by executing the control command, to the web application through a callback function.

If there are two or more types of result data, the result data may be transmitted in XML format to the web application.

The method may further comprise collecting the received result data and providing the collected result data to a user by using the web application.

If there are two or more types of received result data, the providing of the collected result data to the user may comprise reading preregistered XML-formatted property information and providing the read XML-formatted property information to the user.

According to another exemplary embodiment, there is provided a method of controlling a home network device by using home network control equipment comprising a universal web application, the method comprising: receiving from a server control information for controlling the home network device, wherein the receiving is performed by the universal web application; discovering an embedded device and the home network device by using a control point module and a script API that is included in the received control information; and executing a control command on the discovered embedded device and the discovered home network device.

The universal web application may be an HTML-based web browser or an XML-based widget, and the embedded device may be an embedded function of the home network control equipment and may be presented as a UPnP/DLNA device.

The discovering may comprise determining whether the embedded device exists by reading a list of embedded devices by using the script API.

If the embedded device is to be prevented from being controlled by control equipment other than the home network control equipment comprising the embedded device, the executing of the control command may comprise not executing a control command received from the other control equipment based on an Internet Protocol (IP) address or an identifier allocated to the home network control equipment.

A home network may be a UPnP/DLNA-based home network, the home network device may be a UPnP/DLNA device, the home network API may be a UPnP/DLNA API, and the control point module may be a plug-in application, which communicates with the web application, or an embedded object application of a browser.

According to another exemplary embodiment, there is provided a method of controlling a home network device by using home network control equipment comprising a universal web application, the method comprising: receiving from a server control information for controlling the home network device, wherein the receiving is performed by the universal web application; discovering an embedded device and the home network device by using a control point module and a script API that is included in the received control information; executing a control command on the discovered embedded device and the discovered home network device; and presenting to a user a list of content items stored in the home network device or information related to the content items based on result data that is obtained by executing the control command.

According to another exemplary embodiment, there is provided a method of controlling a home network device by using home network control equipment comprising a universal web application, the method comprising: receiving from a server control information for controlling the home network device, wherein the receiving is performed by the universal web application; discovering an embedded device and the home network device by using a control point module and a script API that is included in the received control information; executing a control command on the discovered embedded device and the discovered home network device; and providing to a user content items stored in the home network device or information related to the content items based on result data obtained by executing the control command such that the user can consume the content items or the information related to the content items.

According to another exemplary embodiment, there is provided a method of controlling a home network device by using home network control equipment comprising a universal web application, the method comprising: receiving from a server control information for controlling the home network device, wherein the receiving is performed by the universal web application; discovering an embedded device and the home network device by using a control point module and a script API that is included in the received control information; and executing a control command on the discovered embedded device and the discovered home network device, wherein information related to the home network device, services, users, or content items is prevented from being provided to a third party outside a home network.

According to another exemplary embodiment, there is provided a method of controlling a home network device by using home network control equipment comprising a universal web application, the method comprising: receiving from a server control information for controlling the home network device, wherein the receiving is performed by the universal web application; discovering an embedded device and the home network device by using a control point module and a script API that is included in the received control information; and executing a control command on the discovered embedded device and the discovered home network device, wherein a user can define a set of content items, devices, and services which are accessible to a home network by using the universal web application.

According to another exemplary embodiment, there is provided an apparatus for controlling home network equipment by using a universal web application, the apparatus comprising: a server transmitting control information for controlling the home network equipment to the universal web application; a web application module transmitting a control command, which is issued to control the home network equipment, to a control point module by using a script API that is included in the received control information; the control point module transmitting result data, which is obtained by executing the control command on the home network equipment, to the web application module; and the home network equipment providing a control service requested by the control point module.

The web application module may be an HTML-based web browser or an XML-based widget and comprises a uniform API processing module, wherein the uniform API processing module transmits the control command to the control point module by using the script API.

The script API may have a uniform format, wherein the uniform API processing module comprises a name of an API, which is mapped to a home network API that is used for the control point module to execute the control command, and parameters for the mapped API.

The uniform API processing module may transmit to the control point module the home network API, which is used to execute the control command, as a variable included in the script API.

The web application module may comprise a macro API processing module, wherein the macro API processing module transmits a plurality of control commands by using a macro API that is used to execute one or more control commands on the home network equipment.

A home network may be a UPnP/DLNA-based home network, the home network equipment may be a UPnP/DLNA device, a home network API may be a UPnP/DLNA API, and the control point module may be a plug-in application, which communicates with the universal web application, or an embedded object application of a browser.

The plug-in application may further comprise a UPnP/DLNA API invoking module invoking the UPnP/DLNA API that is used to execute the received control command.

The plug-in application may further comprise a callback function module transmitting the result data, which is obtained by executing the control command, to the web application through a callback function.

If there are two or more types of result data, the plug-in application may transmit the result data in XML format to the web application.

The apparatus may further comprise a user interface module collecting the received result data and providing the collected result data to a user by using the web application.

According to another exemplary embodiment, there is provided an apparatus for controlling home network equipment by using a universal web application, the apparatus comprising: a server transmitting control information for controlling the home network equipment to the universal web application; a web application module transmitting a control command, which is issued to control the home network equipment, to a control point module by using a script API that is included in the received control information; the control point module discovering embedded equipment and the home network equipment of home network control equipment; and the home network equipment providing a control service requested by the control point module.

The web application module may be a HTML-based universal web browser or an XML-based widget, and the apparatus may further comprise an embedded UPnP/DLNA device module, wherein the embedded UPnP/DLNA device module presents the embedded equipment included in the home network control equipment as a UPnP/DLNA device.

The apparatus may further comprise an embedded UPnP/DLNA determining module determining whether the embedded equipment exists by reading a list of embedded equipment by using the script API.

A home network may be a UPnP/DLNA-based home network, the home network equipment may be a UPnP/DLNA device, a home network API may be a UPnP/DLNA API, and the control point module may be a plug-in application, which communicates with the web application, or an embedded object application of a browser.

According to another exemplary embodiment, there is provided a computer-readable recording medium having embodied thereon a program for executing the method of controlling the home network device.

Accordingly, a variety of Universal Plug and Play/Digital Living Network Alliance (UPnP/DLNA) application programming interfaces (APIs) can be transmitted by using a unified JavaScript API in a web browser, UPnP/DLNA control can be made based on HyperText Markup Language/Extensible Markup Language (HTML/XML), and if a plug-in is updated for the purpose of a new UPnP/DLNA extension, an HTML/XML provider needs to correct only a pertinent script and thus easier UPnP/DLNA control can be made.

An embedded function provided in home network control equipment can be presented as a UPnP/DLNA device and thus can be discovered and controlled by a JavaScript function.

BRIEF DESCRIPTION OF THE DRAWINGS

FIG. 3 is a flowchart illustrating a method of controlling a home network device by using a universal web application, according to an exemplary embodiment.

FIG. 4 illustrates a script application programming interface (API) having a uniform format, according to an exemplary embodiment.

FIG. 6 illustrates a code used to control a UPnP/DLNA scheduled recording service (SRS) device by using a script function, according to an exemplary embodiment.

DETAILED DESCRIPTION

The attached drawings illustrate exemplary embodiments, and the exemplary embodiments are referred to in order to gain a sufficient understanding of the concepts of the disclosure.

The exemplary embodiments will now be described more fully with reference to the accompanying drawings.

Figure 1:
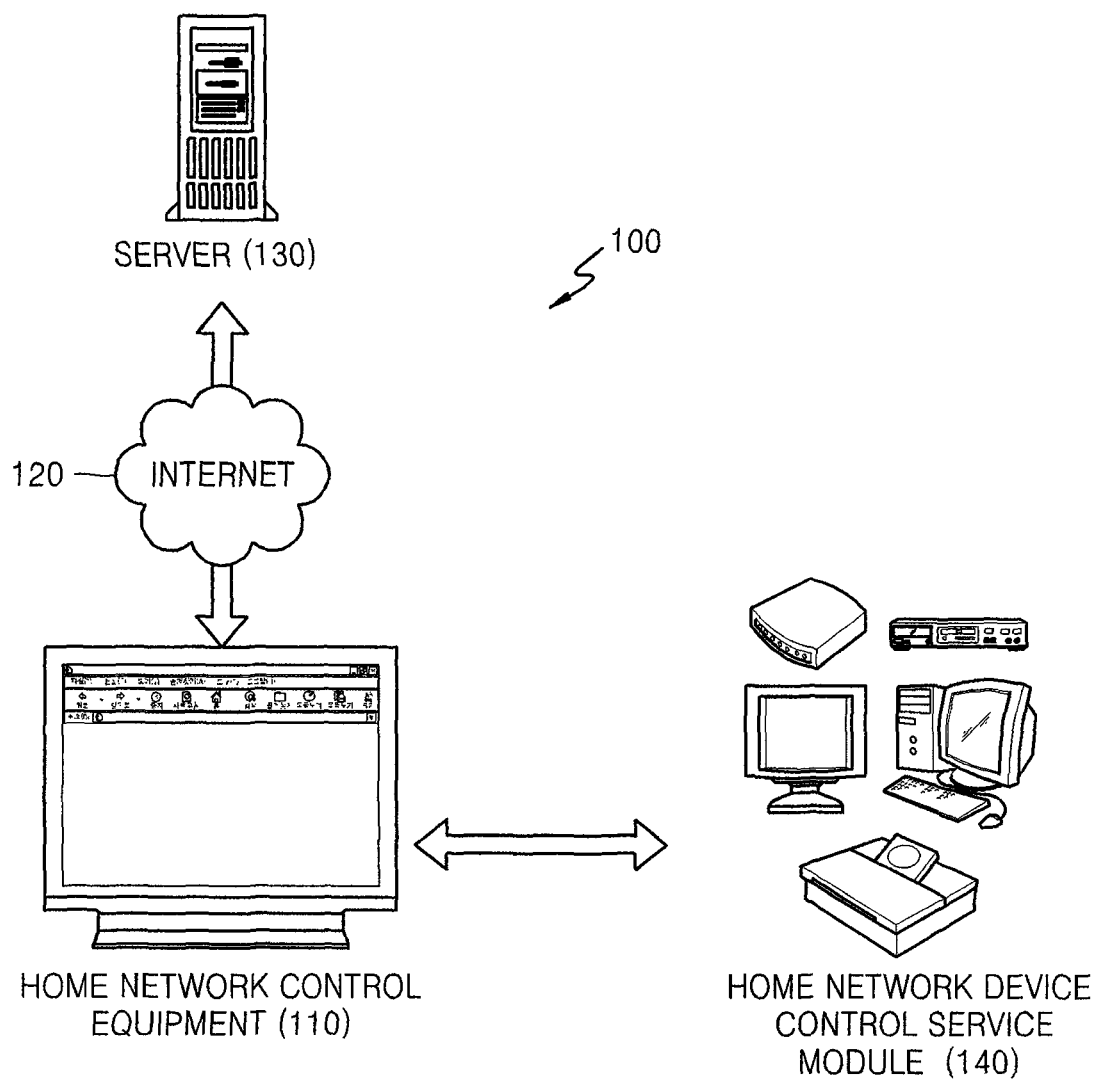
FIG. 1 illustrates a system for controlling a home network device, according to an exemplary embodiment.

FIG. 1 illustrates a system 100 for controlling a home network device, according to an exemplary embodiment.

Referring to FIG. 1, the system 100 includes: a server 130 that transmits through a network 120, for example the Internet, control information for controlling a home network device by using a web application, such as a HyperText Markup Language (HTML)-based universal web browser or an Extensible Markup Language (XML)-based widget; home network control equipment 110 provided with the web application; and a home network device control service module 140 that provides a control service that is required by the home network control equipment 110.

The home network control equipment 110 includes a Universal Plug and Play/Digital Living Network Alliance (UPnP/DLNA) control point module. The web application transmits, to the control point module, a control command of the home network device control service module 140 by using a script application program interface (API) included in the control information received from the server 130. The control point module transmits result data, which is obtained by executing the control command of the home network device control service module 140, to the web application. That is, the web application and the control point module communicate with each other.

The control point module may be a plug-in application communicating with the web application, or an embedded object application of a web browser. A plug-in application refers to a program interacting with a web browser to help perform a function, which is not supported by the web browser, in the web browser. If the control point module is a plug-in application, the control point module discovers and controls a UPnP/DLNA device of a home network. The control command may be generated by a UPnP/DLNA simple object access protocol (SOAP) action.

Also, if the control point module in the home network control equipment 110 is the plug-in application, the control point module receives the result data from the home network device control service module 140, and provides the result data as a script to the web application through a callback function to configure a user interface (UI) screen.

Meanwhile, the server 130 may safely transmit the control information by using encryption technology, and may use asynchronous Hypertext Transfer Protocol (HTTP) communication for UI screen configuration. For example, asynchronous communication may use JavaScript and XML (Ajax). Ajax refers to a group of interrelated web development techniques used for creating interactive web applications. With Ajax, web applications can retrieve data from a server asynchronously. A detailed explanation of Ajax will not be given herein.

Figure 2:
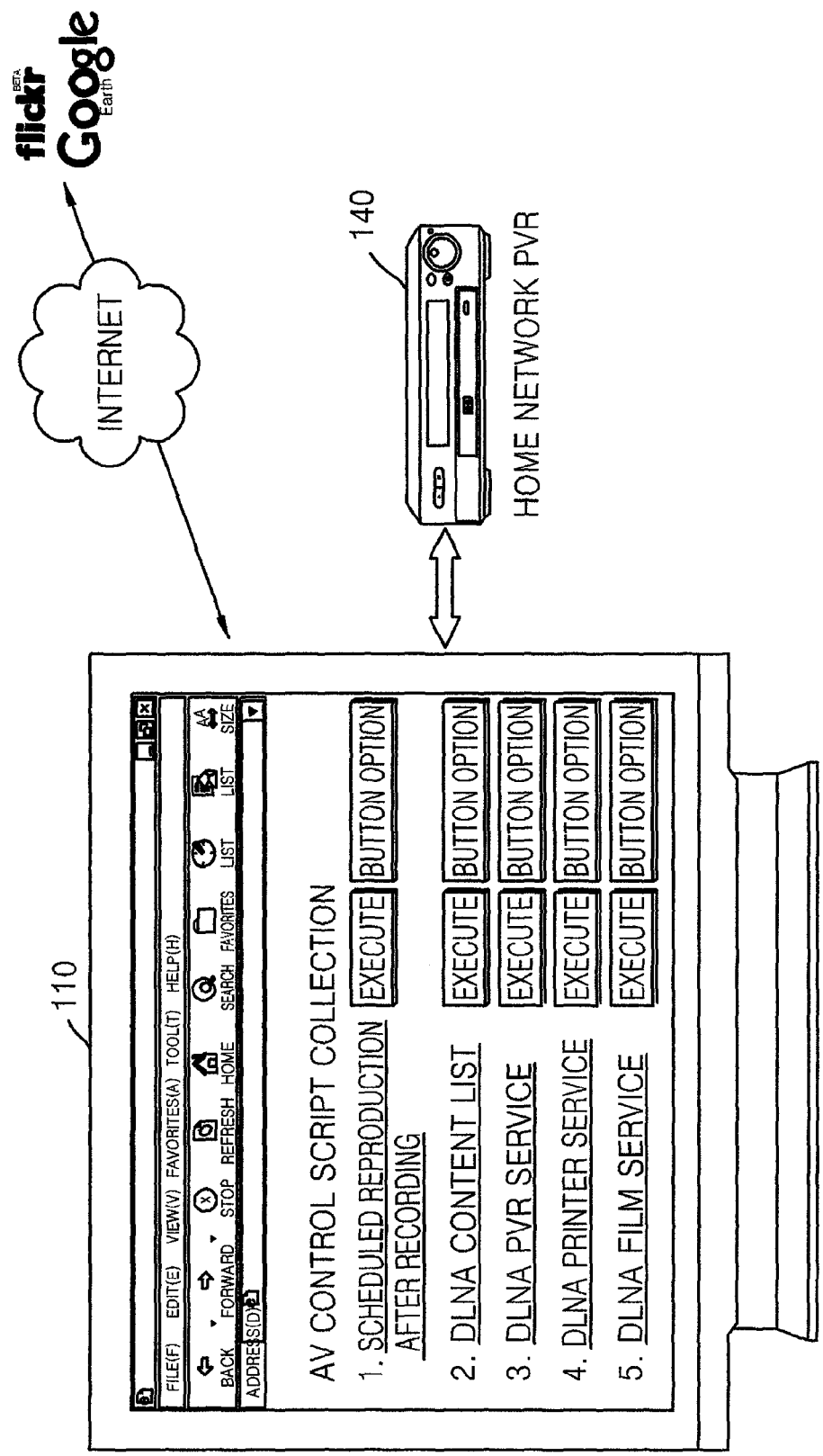
FIG. 2 illustrates a user interface (UI) screen showing services for controlling a home network device by using a universal web application, according to an exemplary embodiment.

FIG. 2 illustrates a UI displayed on a screen of the home network control equipment 110. The displayed UI shows services for controlling a home network device, for example, a home network personal video recorder (PVR), by using a universal web application, according to an exemplary embodiment. FIG. 3 is a flowchart illustrating a method of controlling a home network device by using a universal web application, according to an exemplary embodiment.

Referring to FIGS. 2 and 3, in operation 310, control information for controlling a home network device, e.g., a home network personal video recorder (PVR), by using a universal web application, is received from a server. In operation 320, a control command is transmitted to a control point module (a controller) by using a script API included in the received control information. In operation 330, result data, which is obtained by executing the control command on the home network device, is received from the control point module.

A UPnP/DLNA framework uses a native application in order to reproduce media content of another home network device in a home network.

Accordingly, in order to use a UPnP/DLNA service for controlling a UPnP/DLNA device on a web browser, a function of a UPnP/DLNA control point module should be performed in a plug-in manner. Accordingly, a number of web script APIs should be defined and also there are no measures to deal with a new UPnP/DLNA API.

However, the method illustrated in FIG. 3, of controlling the UPnP/DLNA device over the web by using the universal web application, e.g., a web browser or a web widget, can more easily request a plurality of UPnP/DLNA control commands by using a single script API that can transmit all UPnP/DLNA APIs. The script API may be a JavaScript API.

In addition, the method of FIG. 3 can combine a variety of UPnP/DLNA control commands in a web browser by using a script API having a macro function that can combine a variety of UPnP/DLNA APIs.

Meanwhile, the UPnP/DLNA control point module may transmit to the universal web application, such as the web browser or the widget, through a callback function, the result data, for example, information about a list of DLNA content or information about whether a print/PVR service can be used. If there are two or more types of result data, the result data may be transmitted in XML format. That is, UPnP/DLNA information is transmitted to an XML-based JavaScript function. Accordingly, the JavaScript function parsed by the web browser and the UPnP/DLNA control point module can exchange information with each other for HTML or XML-based home network control.

A JavaScript API having a uniform format will now be explained with reference to FIG. 4.

FIG. 4 illustrates a JavaScript API having a uniform format, according to an exemplary embodiment.

Referring to FIG. 4, UPnPAction( ) 410 is a JavaScript API by which all types of UPnP/DLNA devices can be controlled.

The JavaScript API UPnPAction( ) of FIG. 4 includes (i) a name of an API that is mapped to a home network API that is used for a control point module to execute a control command and (ii) parameters for the mapped API.

Examples of the home network API 420, which is a UPnP/DLNA API, may include CreateRecordSchedule( ), GetRecordSchedule( ), and EnableRecordSchedule( ).

All of the APIs CreateRecordSchedule( ), GetRecordSchedule( ), and EnableRecordSchedule( ) may be implemented by using the JavaScript API UPnPAction( ) having the uniform format as shown in FIG. 4. That is, a home network API that is used to execute a control command may be transmitted as a variable included in the JavaScript API UPnPAction( ) to the control point module. Necessary parameters, for example, <RecordScheduleID></RecordScheduleID>, and <Filter></Filter>, are transmitted along with the transmitted home network API.

Accordingly, the various UPnP/DLNA APIs CreateRecordSchedule( ) GetRecordSchedule( ) and EnableRecordSchedule( ) can be transmitted by using the uniform JavaScript API UPnPAction( ) in a web browser, UPnP/DLNA control can be achieved based on HTML/XML, and if a plug-in is updated for the purpose of new UPnP/DLNA extension, an HTML/XML provider needs to correct only a pertinent script and thus UPnP/DLNA control can be more easily achieved.

Figure 5:
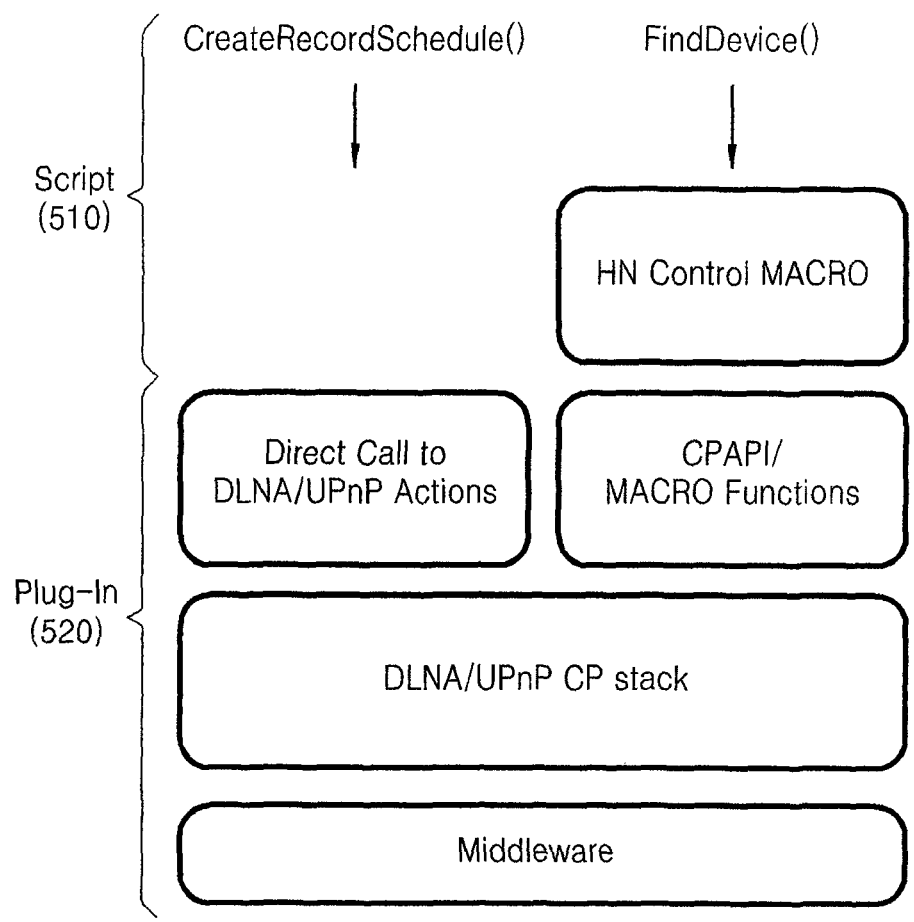
FIG. 5 is a software function block diagram illustrating a procedure of processing a universal plug and play/digital living network alliance (UPnP/DLNA) API and a macro API, according to an exemplary embodiment.

FIG. 5 is a software function block diagram illustrating a procedure of processing a UPnP/DLNA API and a macro API, according to an exemplary embodiment.

Referring to FIG. 5, CreateRecordSchedule( ) and FindDevice( ) API are the UPnP/DLNA API and the macro API, respectively. The macro API FindDevice( ) is a macro UPnP/DLNA function that allows a control point module CP to discover a device. For example, if the macro API FindDevice( ) is FindDevice('SRS'), the control point module CP is allowed to discover a scheduled recording service (SRS) device. The macro API FindDevice( ) may also be PlayAllMusic( ) allowing the control point module CP to reproduce all music files in a home network, or may be FindLocalDevice (tuner) allowing the control point module CP to determine whether a local tuner exists.

As shown in FIG. 5, the UPnP/DLNA API CreateRecordSchedule( ) can directly invoke a UPnP/DLNA action in a plug-in application 520. However, in a script function 510, the macro API FindDevice( ) can invoke an API and perform macro functions by using the plug-in application 520 only after performing a home network control macro step.

Accordingly, various types of UPnP/DLNA functions can be combined by using a single JavaScript API having a macro function. Furthermore, both functions, defined and not defined in UPnP/DLNA, can be performed by defining a new API.

FIG. 6 illustrates code used to control a UPnP/DLNA SRS device by using a script function, according to an exemplary embodiment.

Referring to FIG. 6, a function Record( ) includes title, channelIDType, ChannelID, startTime, and duration as arguments.

If FindDevice('SRS') is invoked, and thus an SRS device is discovered, a variable xmlheader is set to a portion (610), and an API CreateRecordSchedule( ) is transmitted by using an API UPnPAction( ) based on the arguments title, channelIDType, ChannelID, startTime, and duration. The arguments title, channelIDType, ChannelID, startTime, and duration are parameters <arguments><Elements> . . . </Elements></arguments> (620).

The code of FIG. 6 is as follows in detail.

```
<html>
    <head><title>AV Plug-in Control Page </title>
    < object id="DLNA_AV" type="application/DLNA_AV"/></head>
    <script type="text/javascript">
        function InitPlugin( ) {...}
        function OnChangeFromPlugin(val){
            var temp;
            if(val == "DeviceListXML") { temp =
            document.embeds[0].dev_list; }
                else if(val == "ContentListXML") (temp =
document.embeds[0].cnt_list; }
        }
        function DLNAService( )
        { DLNA_AV.HNAction(deviceID, svcName, 'GetdeviceList',
'MediaServer') }
    </script>
    <body onload="InitPlugin( )">
    document.embeds[0].onChange = onChangeFromPlugin;
    <input type="button" value="DLNA film service"
onClick="DLNAService( )"ID="button1"
NAME="DLNAMovie"></body>
    </html>
```

As shown in the above code, in the function DLNAService( ) various types of UPnP/DLNA APIs may be transmitted to a plug-in application through the HNAction function DLNA_AV.HNAction(deviceID, svcName, 'GetdeviceList', 'MediaServer'). Next, the plug-in application parses a UPnP/DLNA function and invokes a related UPnP/DLNA API.

Meanwhile, the function OnChangeFromPlugin(val) of the code is a JavaScript function that processes and transmits a callback function invoked by the plug-in application.

The callback function is on ChangeFromPlugin in <body></body>. If an event occurs and information needs to be transmitted to the JavaScript function OnChangeFromPlugin(val), the callback function is invoked by the plug-in application.

If there are two or more types of information to be transmitted to the JavaScript function OnChangeFromPlugin(val) from the plug-in application, the information is transmitted in XML format.

If there are two or more types of information, e.g., information about a list of devices/content, received by the JavaScript function OnChangeFromPlugin(val), property information, such as document.embeds[0].dev_list and document.embeds[0].cnt_list, is read and processed. Accordingly, the XML information transmitted from the JavaScript function can be parsed and provided to a user. Accordingly, a variety of UPnP/DLNA information can be transmitted to a web browser and various types of data can be shared by the web browser and the plug-in application.

Figure 7:
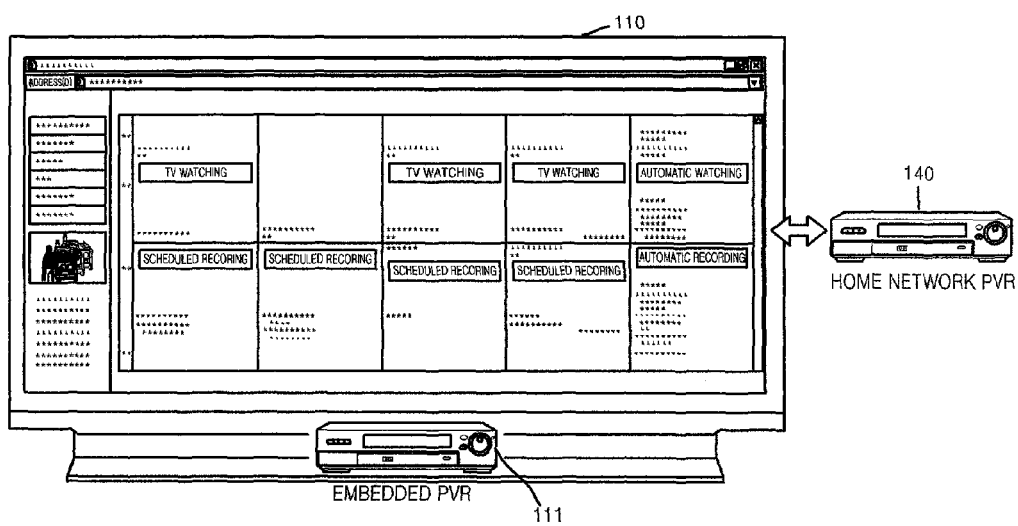
FIG. 7 is a schematic view for explaining a method of controlling an embedded device and a home network device by using a universal web application, according to an exemplary embodiment.

FIG. 7 is a schematic view for explaining a method of controlling an embedded device and a home network device by using a universal web application, according to an exemplary embodiment.

Home network control equipment 110 provided with a web browser performs home network control by using a JavaScript function in such a manner that the JavaScript function transmits a UPnP/DLNA API to a plug-in application and the plug-in application invokes a related UPnP/DLNA API to discover and control a home network PVR 140.

An embedded or built-in function, that is, an embedded PVR function 111, may exist in the home network control equipment 110, for example, a digital television (DTV), which is provided with the web browser.

For example, if the home network control equipment 110 is a DTV having a PVR function, and the home network PVR 140 is not controlled by UPnP/DLNA technology, the PVR function cannot be controlled by the JavaScript function.

To solve the problem, the method of FIG. 7 presents the embedded PVR function 111 as a UPnP/DLNA device such that the JavaScript function can discover the embedded PVR function 111 and control the discovered embedded PVR function 111.

The method of controlling the home network device by using the home network control equipment 110 including the universal web application of FIG. 7 includes receiving control information from a server by using the universal web application, discovering the home network device, i.e., the home network PVR 140, and the embedded function, i.e., the embedded PVR function 111, by using a control point module and a script API that is included in the received control information, and executing a control command on the discovered home network device and the embedded device.

The embedded function, which is the embedded PVR function 111 provided in the control equipment 110, may be presented as a UPnP/DLNA device. Accordingly, the embedded function can be discovered and controlled by the JavaScript function like the home network device.

Meanwhile, if the embedded function is presented as a UPnP/DLNA device, it is necessary to determine whether the UPnP/DLNA device discovered by the JavaScript function is the embedded function or the home network device. Accordingly, the configuration of FIG. 7 may be used to determine whether the embedded function exists by reading a list of embedded devices by using a script API.

For example, FindLocalDevice(DeviceType), which is an API for discovering the embedded function, HNAction(DeviceHandle, ServiceHandle, ActionName, ActionParameters, UserCookie), which is an API for requesting performance of a SOAP Action, or on HNActionResult, which is a property of a callback function for obtaining SOAP result data, may be used.

In some cases, other equipment in the home network should not control the embedded function that is presented as the UPnP/DLNA device. Accordingly, if the embedded function should not be controlled by control equipment, other than the home network control equipment 110 provided with the embedded function, a control command received from the other control equipment may not be executed based on an identifier or an Internet protocol (IP) address, such as localhost address or 127.0.0.1, allocated to the home network control equipment 110.

The configuration of FIG. 7 can provide a user with a list of content items stored in the home network device or information related to the content items, and can provide support such that the user is able to consume the content items or the information related to the content items.

In addition, information related to the home network device, services, users, or content can be prevented from being provided to a third party outside the home network, for example, including an IPTV service provider or a trusted third Internet service provider. Also, the user can define a set of content items, devices, and services which are accessible to the home network by using the web application.

The method of controlling the home network device may be written as computer programs and may be implemented in general-use digital computers that execute the programs by using a computer-readable recording medium.

Also, as described above, data used in the present invention may be recorded by using various means on the computer-readable recording medium.

Examples of the computer-readable recording medium include storage media such as magnetic storage media (e.g., read only memories (ROMs), floppy discs, or hard discs), optically readable media (e.g., compact disk-read only memories (CD-ROMs), or digital versatile disks (DVDs)) and carrier waves (e.g., transmissions over the Internet).

While the present disclosure has been particularly shown and described with reference to exemplary embodiments thereof using specific terms, the embodiments and terms have been used to explain the present invention and should not be construed as limiting the scope of the present disclosure defined by the claims. The preferred embodiments should be considered in a descriptive sense only and not for purposes of limitation. Therefore, the scope of the disclosure is defined not by the detailed description, but by the appended claims, and all differences within the scope will be construed as being included in the present invention.

The invention claimed is:

1. A method of controlling a home network device by using a universal web application, the method comprising:
   receiving, by the universal web application, control information from a server, the control information for controlling the home network device;
   transmitting a control command that controls the home network device to a control point module by using a script application program interface (API) that is included in the received control information; and
   receiving from the control point module result data that is obtained by executing the control command on the home network device,
   wherein the script API has a uniform format and comprises a name of a home network API as a variable for the control point module to implement a function of the home network API and execute the control command and parameters for the implementing home network API.

2. The method of claim 1, wherein a home network is a Universal Plug and Play/Digital Living Network Alliance (UPnP/DLNA)-based home network, the home network device is a UPnP/DLNA device, the home network API is a UPnP/DLNA API, and the control point module is a plug-in application, which communicates with the universal web application, or an embedded object application of a browser.

3. The method of claim 2, wherein the plug-in application invokes the UPnP/DLNA API that is used to execute the received control command.

4. The method of claim 3, wherein the plug-in application transmits the result data, which is obtained by executing the control command, to the web application through a callback function.

5. The method of claim 4, wherein, if the result data comprises plural types of result data, the result data is transmitted in XML format to the web application.

6. The method of claim 1, wherein the universal web application is a HyperText Markup Language (HTML)-based web browser or an Extensible Markup Language (XML)-based widget.

7. The method of claim 6, wherein the transmitting of the control command to the control point module comprises transmitting to the control point module the home network API, which is used to execute the control command.

8. The method of claim 1, wherein the receiving of the control information is performed by asynchronous Hypertext Transfer Protocol (HTTP) communication for user interface screen configuration.

9. The method of claim 8, wherein the asynchronous communication uses asynchronous JavaScript and XML (Ajax).

10. The method of claim 1, further comprising collecting the received result data and providing the collected result data to a user by using the web application.

11. The method of claim 10, wherein, if the result data comprises plural types of received result data, the providing of the collected result data to the user comprises reading preregistered XML-formatted property information and providing the read XML-formatted property information to the user.

12. The method of claim 1, wherein the transmitting of the control command to the control point module comprises transmitting a plurality of control commands by using a macro API that executes one or more control commands on the home network device.

13. An apparatus for controlling home network equipment by using a universal web application, the apparatus comprising:
   at least one memory operable to store program instruction; and
   at least one processor operable to read said program instruction and configured by the program instruction to operate as:
   a web application module that receives control information for controlling the home network equipment from a server and transmits a control command, which controls the home network equipment, to a control point module by using a script API that is included in the received control information; and
   the control point module transmitting result data, which is obtained by executing the control command on the home network equipment, to the web application module,
   wherein the web application module comprises a uniform API processing module,
   wherein the script API has a uniform format, and
   wherein the script API comprises a name of a home network API as a variable for the control point module to implement a function of the home network API and execute the control command, and parameters for implementing the home network API.

14. The apparatus of claim 13, wherein a home network is a UPnP/DLNA-based home network, the home network equipment is a UPnP/DLNA device, a home network API is a UPnP/DLNA API, and the control point module is a plug-in application, which communicates with the universal web application, or an embedded object application of a browser.

15. The apparatus of claim 14, wherein the plug-in application further comprises a UPnP/DLNA API invoking module invoking the UPnP/DLNA API that executes the received control command.

16. The apparatus of claim 15, wherein the plug-in application further comprises a callback function module transmitting the result data, which is obtained by executing the control command, to the web application through a callback function.

17. The apparatus of claim 16, wherein, if the result data comprises plural types of result data, the plug-in application transmits the result data in XML format to the web application.

18. The apparatus of claim 13, wherein the web application module is an HTML-based web browser or an XML-based widget,
   wherein the uniform API processing module transmits the control command to the control point module by using the script API.

19. The apparatus of claim 13, wherein the uniform API processing module transmits to the control point module the home network API, which is used to execute the control command, as a variable included in the script API.

20. The apparatus of claim 13, wherein the web application module comprises a macro API processing module, wherein the macro API processing module transmits a plurality of control commands by using a macro API that executes one or more control commands on the home network equipment.

21. The apparatus of claim 13, wherein the at least one processor is further configured by the program instruction to operate as: a user interface module that collects the received result data and provides the collected result data to a user by using the web application.

22. A method of controlling a home network device by using home network control equipment comprising a universal web application, the method comprising:
receiving, by the universal web application, control information from a server, the control information for controlling the home network device;
discovering an embedded device and the home network device by using a control point module and a script API that is included in the received control information; and
executing a control command on the discovered embedded device and the discovered home network device,
wherein the script API has a uniform format and comprises a name of a home network API as a variable for the control point module to implement a function of the home network API and execute the control command and parameters for the implementing home network API.

23. The method of claim 22, wherein the universal web application is an HTML-based web browser or an XML-based widget, and the embedded device is an embedded function of the home network control equipment and is presented as a UPnP/DLNA device.

24. The method of claim 22, wherein the discovering comprises determining whether the embedded device exists by reading a list of embedded devices by using the script API.

25. The method of claim 22, wherein, if the embedded device is to be prevented from being controlled by control equipment other than the home network control equipment comprising the embedded device, the executing of the control command comprises not executing a control command received from the other control equipment based on an Internet Protocol (IP) address or an identifier allocated to the home network control equipment.

26. The method of claim 22, wherein a home network is a UPnP/DLNA-based home network, the home network device is a UPnP/DLNA device, the home network API is a UPnP/DLNA API, and the control point module is a plug-in application, which communicates with the web application, or an embedded object application of a browser.

27. An apparatus for controlling home network equipment by using a universal web application, the apparatus comprising:
at least one memory operable to store program instructions; and
at least one processor operable to read said program instruction and configured by the program instruction to operate as:
a web application module that receives control information for controlling the home network equipment from a server and transmits a control command, which controls the home network equipment, to a control point module by using a script API that is included in the received control information; and
the control point module discovering embedded equipment and the home network equipment and executing the control command on the discovered embedded equipment and the discovered home network equipment,
wherein the script API has a uniform format and comprises a name of a home network API as a variable for the control point module to implement a function of the home network API and execute the control command and parameters for the implementing home network API.

28. The apparatus of claim 27, wherein the web application module is a HTML-based universal web browser or an XML-based widget,
the at least one processor is further configured by the program instruction to operate as: an embedded UPnP/DLNA device module,
wherein the embedded UPnP/DLNA device module presents the embedded equipment included in the home network control equipment as a UPnP/DLNA device.

29. The apparatus of claim 27, wherein the at least one processor is further configured by the program instruction to operate as: an embedded UPnP/DLNA determining module that determines whether the embedded equipment exists by reading a list of embedded equipment by using the script API.

30. The apparatus of claim 27, wherein a home network is a UPnP/DLNA-based home network, the home network equipment is a UPnP/DLNA device, a home network API is a UPnP/DLNA API, and the control point module is a plug-in application, which communicates with the web application, or an embedded object application of a browser.

31. A method of controlling a home network device by using home network control equipment comprising a universal web application, the method comprising:
receiving, by the universal web application, control information from a server, the control information for controlling the home network device;
discovering an embedded device and the home network device by using a control point module and a script API that is included in the received control information;
executing a control command on the discovered embedded device and the discovered home network device; and
presenting to a user a list of content items stored in the home network device or information related to the content items based on result data that is obtained by executing the control command,
wherein the script API has a uniform format and comprises a name of a home network API as a variable for the control point module to implement a function of the home network API and execute the control command and parameters for the implementing home network API.

32. A method of controlling a home network device by using home network control equipment comprising a universal web application, the method comprising:
receiving, by the universal web application, control information from a server, the control information for controlling the home network device;
discovering an embedded device and the home network device by using a control point module and a script API that is included in the received control information;
executing a control command on the discovered embedded device and the discovered home network device; and
providing to a user content items stored in the home network device or information related to the content items based on result data obtained by executing the control command,
wherein the script API has a uniform format and comprises a name of a home network API as a variable for the control point module to implement a function of the home network API and execute the control command and parameters for the implementing home network API.

33. A method of controlling a home network device by using home network control equipment comprising a universal web application, the method comprising:

receiving, by the universal web application, control information from a server, the control information for controlling the home network device;

discovering an embedded device and the home network device by using a control point module and a script API that is included in the received control information; and executing a control command on the discovered embedded device and the discovered home network device, wherein information related to the home network device, services, users, or content items is prevented from being provided to a third party outside a home network, and wherein the script API has a uniform format and comprises a name of a home network API as a variable for the control point module to implement a function of the home network API and execute the control command and parameters for the implementing home network API.

34. A method of controlling a home network device by using home network control equipment comprising a universal web application, the method comprising:

receiving, by the universal web application, control information from a server, the control information for controlling the home network device;

discovering an embedded device and the home network device by using a control point module and a script API that is included in the received control information; and executing a control command on the discovered embedded device and the discovered home network device, wherein the universal web application defines a set of content items, devices, and services which are accessible to a home network, and wherein the script API has a uniform format and comprises a name of a home network API as a variable for the control point module to implement a function of the home network API and execute the control command and parameters for the implementing home network API.

* * * * *